United States Patent
Slots et al.

(10) Patent No.: US 7,316,256 B2
(45) Date of Patent: Jan. 8, 2008

(54) TYRE DRUM WITH TURN-UP MECHANISM FOR BUILDING AN UNVULCANIZED TYRE

(75) Inventors: Anthonie Slots, Heeten (NL); Henk-Jan Grolleman, Eerbeek (NL)

(73) Assignee: VMI EPE Holland B.V., RK EPE (NL)

( * ) Notice: Subject to any disclaimer, the term of this patent is extended or adjusted under 35 U.S.C. 154(b) by 373 days.

(21) Appl. No.: 10/531,130

(22) PCT Filed: Oct. 15, 2003

(86) PCT No.: PCT/NL03/00698

§ 371 (c)(1),
(2), (4) Date: Apr. 13, 2005

(87) PCT Pub. No.: WO2004/035301

PCT Pub. Date: Apr. 29, 2004

(65) Prior Publication Data

US 2005/0244528 A1    Nov. 3, 2005

(30) Foreign Application Priority Data

Oct. 16, 2002   (NL)   .................................... 1021668

(51) Int. Cl.
*B29D 30/32* (2006.01)
*B29D 30/24* (2006.01)

(52) U.S. Cl. ...................................... 156/402; 156/415

(58) Field of Classification Search ................ 156/402, 156/415, 132
See application file for complete search history.

(56) References Cited

U.S. PATENT DOCUMENTS 6,318,434 B1 * 11/2001 Gutknecht et al. .......... 156/402
2002/0104620 A1    8/2002 Sala

FOREIGN PATENT DOCUMENTS

WO    98/52740 A    11/1998
WO    01/68356 A    9/2001

\* cited by examiner

*Primary Examiner*—Geoffrey L. Knable
(74) *Attorney, Agent, or Firm*—Ladas and Parry LLP

(57) ABSTRACT

A tyre drum has a central shaft, two ring segments around the shaft and spaced apart for supporting bead cores and, on either side outside of the ring segments, sets of axially extending arms having free ends with first turn-up means, particularly a turn-up roller, opposite second ends hinged to an axially shiftable arm support and, near the free end, a tyre component support roller rotatable on the arm. A shifter shifts the arm supports to move the second ends axially towards each other and tilt the arms in radial planes from the initial position to a tilting position for the first ends to press tyre components outside of the ring segments against an expanded part of the tyre components within the ring segments.

9 Claims, 7 Drawing Sheets

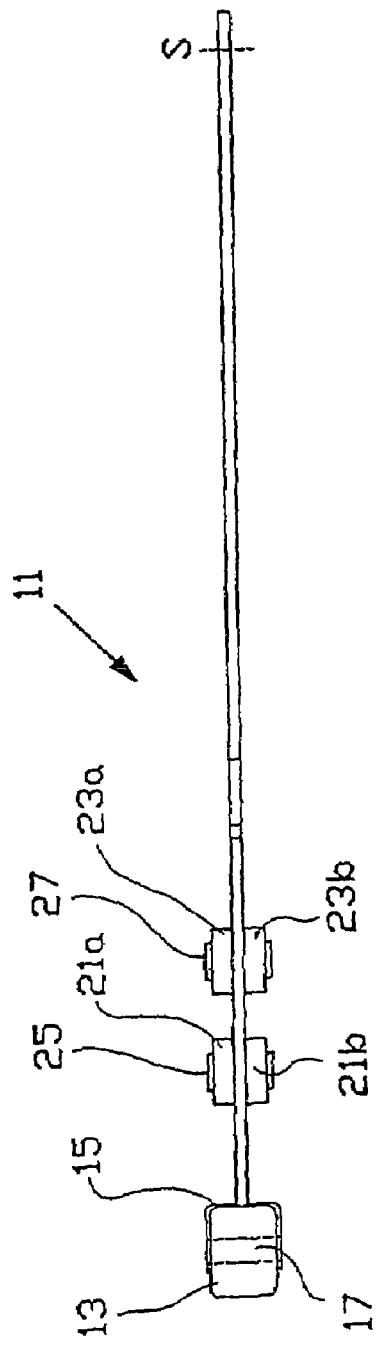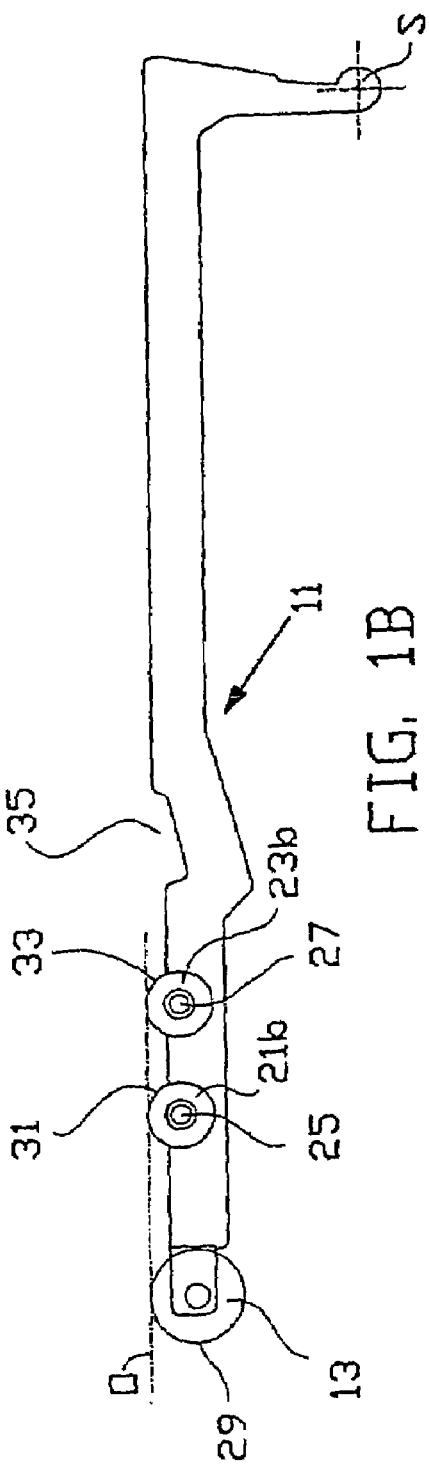

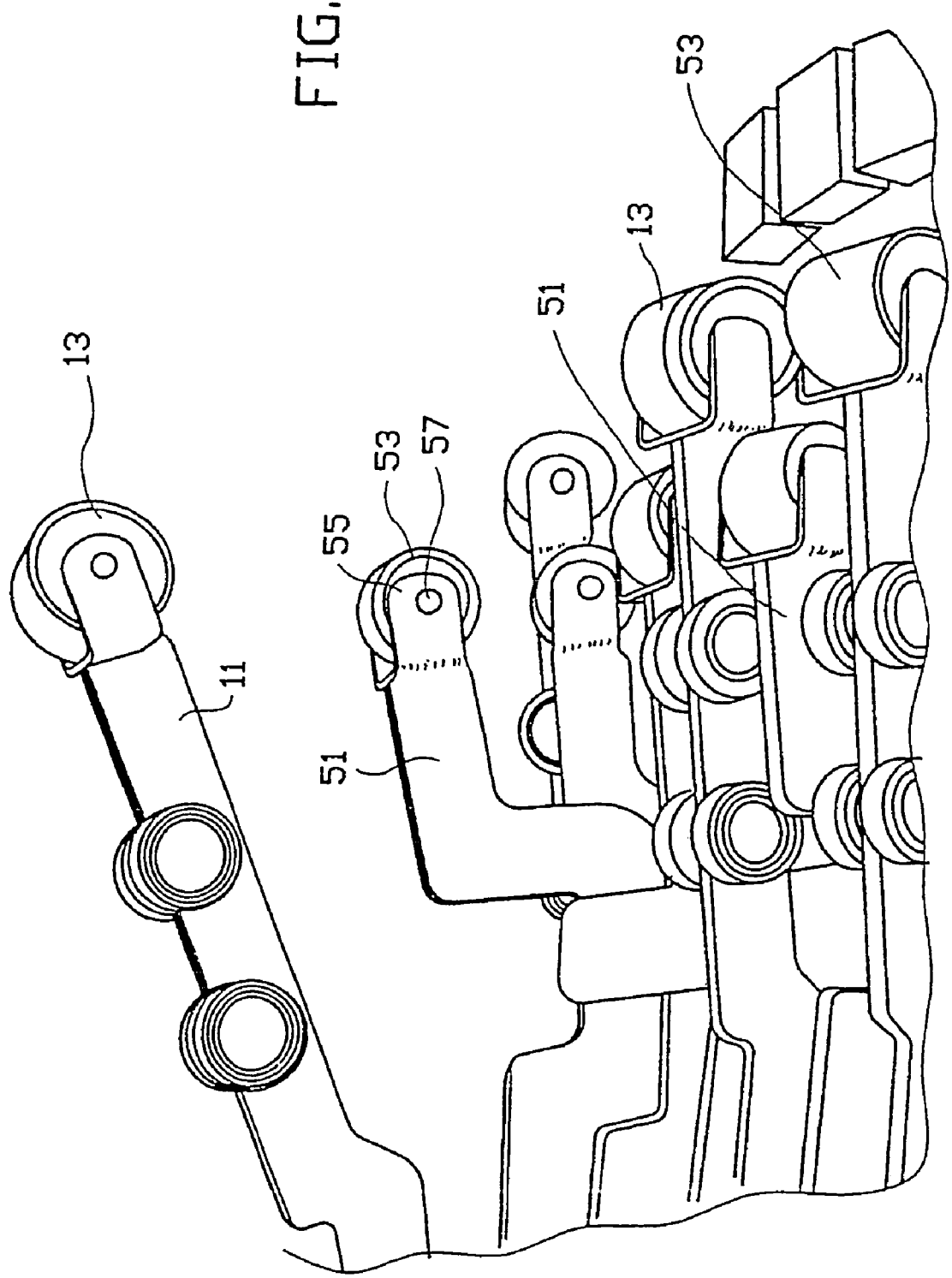

TYRE DRUM WITH TURN-UP MECHANISM FOR BUILDING AN UNVULCANIZED TYRE

BACKGROUND OF THE INVENTION

The invention relates to a tyre drum including a turn-up mechanism for use in building an unvulcanized tyre having tyre components of rubber, having reinforcement cords and two bead cores which either may or may not be provided with a bead filling strip.

A known tyre drum has been provided with a central shaft, two ring segments placed around the shaft and spaced apart for supporting the bead cores and means for radially expanding the part of the tyre components that is situated within the ring segments. On either side outside of the ring segments the tyre drum is provided with a set of axially extending arms, each arm at a first free end oriented towards the ring segment being provided with a first turn-up means, particularly a turn-up roller, and at an opposite second end being hinged to an axially shiftable arm support. Near the first end each arm is provided with means for supporting the tyre component.

In the initial position the support means form a circumferential series of support surfaces for the tyre components. For the turn-up process the second ends of both sets of arms are axially moved towards each other by means of means for shifting the arm supports. Because simultaneously the part of the tyre components situated within the ring segments is expanded the arms will be subjected to a tilting movement in radial planes to a tilting position, as a result of which the first ends move axially and radially while pressing the part of the tyre components situated outside of the ring segments against the expanded part of the tyre components situated within the ring segments.

Such tyre drums provided with a turn-up mechanism are generally known.

They may be designed as tyre building drum on which the tyre components, in particular liner and carcass layers are supplied and of which a cylindrical sleeve is being made, and also bead cores are supplied, after which the cylindrical sleeve on the tyre building drum is expanded into a shaped torus shape, in which the sides of the sleeve are turned up about the bead cores by means of the turn-up mechanism. They may also be designed as a shaping drum, to which an already formed cylindrical carcass sleeve has been supplied.

Such a tyre building drum including turn-up mechanism is among others known from International patent application WO 98/52740. During the turn-up process in which the arms tilt, the parts of the tyre components that are situated on the support means shift over the support means towards the turn-up means (turn-up roller) in order to be discharged from there. The sets of hinging arms on either side outside of the ring segments are synchronously movable from the initial position to the tilting position by a mechanical coupling.

When tilting the arms the diameter defined by the series of support means on the arms becomes larger, as a result of which the part of the tyre components supported on the arms is subjected to tensile stress and comes to lie more tightly around the arms. As a result the tyre components in the tilting position of the arms will be very tight—and therefore straight—between the arms. The resistance against shifting along the arms will also become larger, as a result of which the turn-up process is hindered. This is particularly the case in processes in which high and/or soft side walls are being turned-up.

In International patent application WO 01/68356 an improvement is suggested, in which the support means may be formed by a support plate that can be shifted along the arm which plate in a final position can extend over the turn-up roller, or by a support belt circulating freely about the turn-up roller and about a roller backwardly spaced on the arm. These solutions can in principle be used, but due to the complexity malfunctions may occur.

SUMMARY OF THE INVENTION

It is an object of the present invention to provide a tyre drum including a simple turn-up mechanism having arms by means of which tyres can be manufactured accurately.

From one aspect the invention to that end provides a tyre drum including a turn-up mechanism for use in building an unvulcanized tyre having tyre components of rubber, including reinforcement cords and two bead cores which either may or may not be provided with a bead filling strip, which tyre drum is provided with a central shaft, two ring segments placed around the shaft and spaced apart for supporting the bead cores and means for radially expanding the part of the tyre components that is situated within the ring segments and the tyre drum on either side outside of the ring segments being provided with a set of axially extending arms, the arms at a first free end oriented towards the ring segment being provided with a first turn-up means, particularly a turn-up roller, and at an opposite second end being hinged to an axially shiftable arm support, near the first end at least a part of the arms being provided with means for supporting the tyre component, the support means in an initial position forming a circumferential support surface for the tyre components, the tyre drum further being provided with means for shifting the arm supports in order to move the second ends of both sets of arms axially towards each other, the arms being tiltable in radial planes from the initial position to a tilting position in order to thus move the first ends axially and radially while pressing the part of the tyre components situated outside of the ring segments against the expanded part of the tyre components situated within the ring segments, the support means comprising at least one support roller provided with a support surface for the tyre component, which support roller is rotatably arranged on the arm.

The support rollers form a simple and cheap addition to the arms and provide a reliably operating rolling support for the tyre components during the turn-up process, particularly also when tyres having high or limp side walls have to be made. It is advantageous that no support surface moves between the turn-up roller and the tyre component that might get dirty and as a result would increase the friction (adhesion): the turn-up roller itself is in continuous contact with the tyre component. The simple support roller hardly constitutes an increase of the weight of the arm, which is advantageous when using long arms.

The arm may be provided with at least two support rollers arranged adjacent to each other on either side of the arm, as a result of which the attachment of the support rollers is simple. The arm may be made from a plate here, the support rollers being situated on either side of the plate material.

The arm may be provided with at least two support rollers arranged spaced apart in arm direction, as a result of which the tyre components are offered support on several locations situated spaced apart along the arm.

The running off of the tyre component from the arm during the turn-up process is enhanced when the support roller is arranged on the arm in a free-running manner.

The support surface of the support roller may be in one plane with the surface of the turn-up roller, which in the initial position is tangential to the centre line of the central shaft, as a result of which an at least almost straight-circle-cylindrical support surface is offered.

In a further development each set of arms comprises primary arms provided with one or more support rollers and secondary arms that have no support rollers and that are situated in between the primary arms, the support rollers of the primary arms defining a circumferential series of support surfaces and the turn-up rollers of the secondary arms being radially recessed with respect to the turn-up rollers of the primary arms. The use of two types of arms in each set has already been suggested in the aforementioned WO 98/52740, but in that document the turn-up rollers of the secondary arms are situated at the same circumferential circle as the turn-up rollers of the primary arms. In the new proposal the advantage of two types of arms described in WO 98/52740 is joined with the advantage of support surfaces, but the secondary arms are kept simple and relatively lightweight without loss of effectiveness.

The turn-up rollers of the secondary arms with their surface in radial direction may extend at the most to the connecting line or chord of the support surfaces of the two support rollers situated adjacent at either side, and preferably they remain below it.

The turn-up roller of the secondary arms in the initial position may be situated with respect to the ring segments in axial direction behind the turn-up roller of the adjacent primary arms. Thus the turn-up rollers of the primary arms can be situated closely next to each other in the initial position.

The turn-up roller of the secondary arms considered in axial direction may be situated between the turn-up roller of the primary arms and the nearest support roller on those arms, as a result of which also the support rollers of the adjacent situated primary arms can be situated close to each other.

From a further aspect the invention provides a tyre drum of the indicated type, secondary arms provided with a turn-up roller being arranged between the arms provided with one or more support rollers, of which secondary arms the turn-up roller in the initial position is recessed in comparison with the turn-up roller of the adjacent arms provided with one or more support rollers, of which arms the support rollers define a circumferential series of support surfaces.

From a further aspect the invention provides a tyre drum including a turn-up mechanism for use in building an unvulcanized tyre having tyre components of rubber, including reinforcement cords and two bead cores which either may or may not be provided with a bead filling strip, which tyre drum is provided with a central shaft, two ring segments placed around the shaft and spaced apart for supporting the bead cores and means for radially expanding the part of the tyre components that is situated within the ring segments and the tyre drum on either side outside of the ring segments being provided with a set of axially extending arms, the arms at a first free end oriented towards the ring segment being provided with a first turn-up means, particularly a turn-up roller, and at an opposite second end being hinged to an axially shiftable arm support, the tyre drum furthermore being provided with means for shifting the arm supports in order to move the second ends of both sets of arms axially towards each other, the arms being tiltable in radial planes from the initial position to a tilting position in order to thus move the first ends axially and radially while pressing the part of the tyre components situated outside of the ring segments against the expanded part of the tyre components situated within the ring segments, each set of arms comprising primary arms provided with a turn-up roller as well as secondary arms situated in between them and also provided with a turn-up roller, the turn-up rollers of the primary arms in the initial position defining a circumferential series of support surfaces for tyre components and the turn-up rollers of the secondary arms being radially recessed with respect to the turn-up rollers of the primary arms.

The turn-up roller of the secondary arms in the initial position may be situated with respect to the ring segments in axial direction behind the turn-up roller of the adjacent primary arms, so that the turn-up rollers of the primary arms can be situated closely next to each other in the initial position.

A possible embodiment of the tyre (building) drum including turn-up mechanism having arms according to the invention is described below by way of example on the basis of the drawings.

BRIEF DESCRIPTION OF THE DRAWINGS

FIGS. 1A and 1B show a top view and a side view, respectively, of an arm for a tyre drum according to the invention;

FIGS. 3A and 3B schematically show a side view of an assembly of two different turn-up arms and a detail of the first ends of an assembled set of turn-up arms.

DETAILED DESCRIPTION OF THE DRAWINGS

Figure 2A:
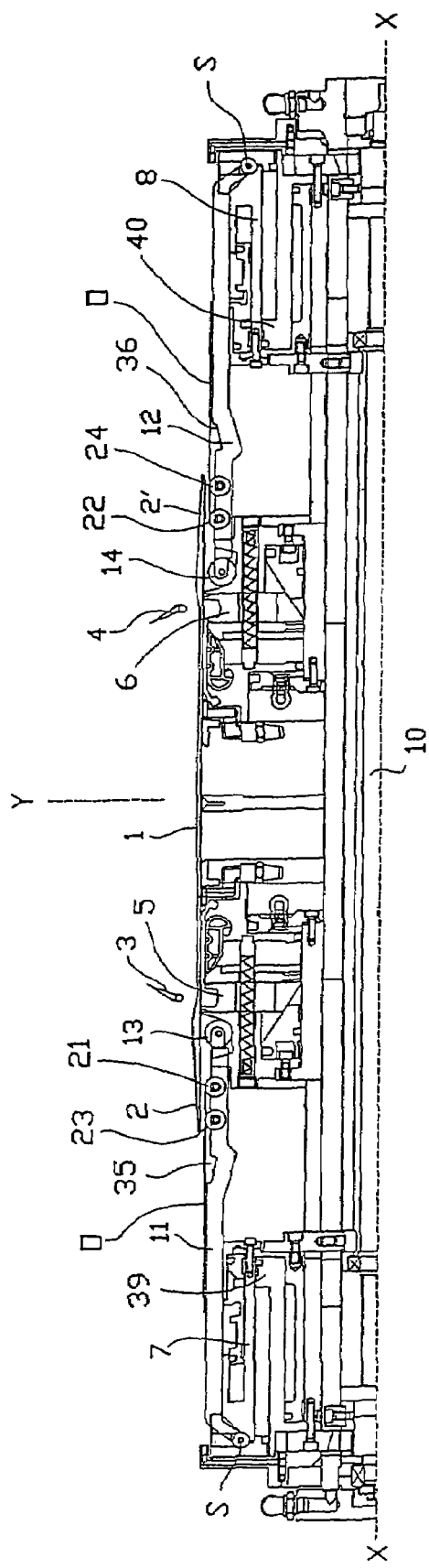
FIGS. 2A to 2D schematically show a longitudinal section of a tyre building drum including turn-up mechanism according to the invention for building an unvulcanized tyre, in various processing steps.

In the FIGS. 1A and 1B the build-up of the turn-up arms 11 is illustrated.

The arms 11 are flat and elongated and at their free end are provided with a turn-up roller 13, which by means of little shaft or pin 17 is bearing mounted in a free-running manner in a fork 15 that is permanent to the arm 11. At a small distance from the fork 15 a pair of support rollers 21a, b has been arranged on the arm 11 in a free-running manner by means of a pin 25. At a slightly smaller distance therefrom a second pair of support rollers 23a,b has been arranged on arm 11 in a free-running manner by means of a pin 27. The pins 17, 25 and 27 are parallel to each other. The support rollers 21a,b and 23a,b have a diameter that is smaller than the diameter of the turn-up roller 13. The tangent planes of the surfaces 29, 31 and 33 of the turn-up roller 13, support rollers 21a,b and support rollers 23a,b, respectively, are in one plane O with each other, which plane forms a virtual support surface for tyre components. The support surfaces O of consecutive arms by approximation form circle-cylindrical circumferential support surface about the tyre drum. The surfaces 29 of the turn-up rollers 13 and the support surfaces 31, 33 of adjacently situated arms 11 form a circumferential series of support surfaces, that connect to each other as closely as possible.

As can be seen in FIG. 1B, the arm 11 is L-shaped, in which the other end S is suitable to be mounted in a hinging manner.

In FIG. 1A it can be seen that the support rollers 21a,b and 23a,b extend sideward over equal length over arm 11, but remain within the outside of the fork 15.

At a location between the last support rollers 23 and the second end, the arms 11 have furthermore been provided with a recess 35 for a usual tensile means, such as an elastic ring, extending circumferentially about the drum.

FIGS. 2A to 2D schematically show a longitudinal section of a tyre building drum 1 that is symmetrical about plane Y and includes a turn-up mechanism according to the invention for building an unvulcanized (radial) tyre, in different processing steps. Such an unvulcanized tyre comprises tyre components 2 made of rubber, optionally provided with reinforcement cords, (in the stage shown in FIG. 2A the used tyre components are a so-called liner having two sides 2a and a carcass layer) and two bead cores 3 with—in this case—a high bead filling strip on it. The number and the type of tyre components depend on the tyre to be manufactured in the end, and the possible compositions and build-up are sufficiently known to the expert so that they will not be further discussed here.

The tyre building drum 1 is provided with a central shaft 10 having centre line X. About the shaft 10 and at a distance from each other two annular bead clamping segments 5, 6 have been placed, each for supporting corresponding bead cores 3, 4 and provided with mobile inner supports, which prevent that during the forming (FIG. 2D) of the carcass is pressed off from the annular segments 5, 6. Furthermore there are means (not shown in the figures) for—for instance by means of air pressure—radially expanding the part of the tyre components that is situated within the segments 6.

About the shaft 10—at both ends—two annular cylinders 7, 8 are also arranged, in which cylinders pistons 39, 40 extend. At the location of hinge points S turn-up arms 11, 12 according to FIGS. 1A, 1B are connected to the cylinders 39, 40, such that in the initial position shown in FIG. 2A, the plane O of each arm 11, 12 runs parallel to the centre line X. The arms 12 are identical to the arms 11, having turn-up rollers 14, support rollers 22, 24 and recess 36.

In the situation of FIG. 2A the tyre components 2 in the form of a liner (inner liner) having side walls 2' have been arranged, and after that one or more cord plies and optional reinforcement strips. By means of a ply-splice stitcher roller which is moved in axial direction over the circumference, the layers are spliced together, so that a cylindrical tyre sleeve is created.

Figure 2B:
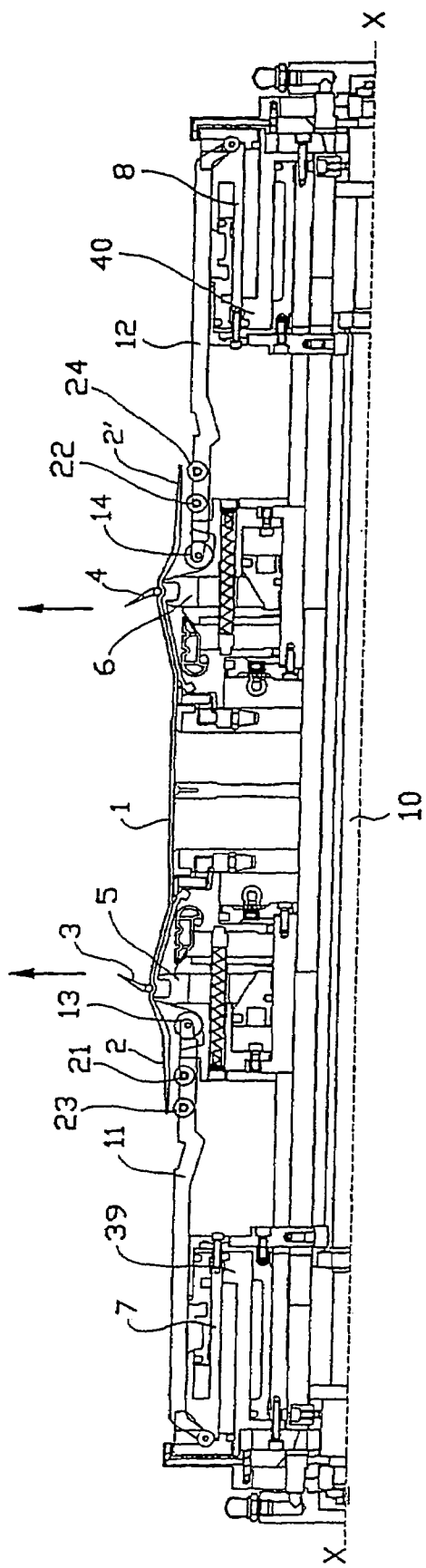

Subsequently the bead clamping segments 5, 6 are radially expanded, so that they extend radially above the support surface O. They clamp the tyre material about the bead core 3, 4 in order to ensure an airtight clamping. Due to the upward pressing, the tyre material 2' is already loosened a little at that location from the support surfaces O. This is shown in FIG. 2B. In a supple manner, without considerable resistance, the tyre components 2' slide over the surfaces of the support rollers 21-24.

Figure 2C:
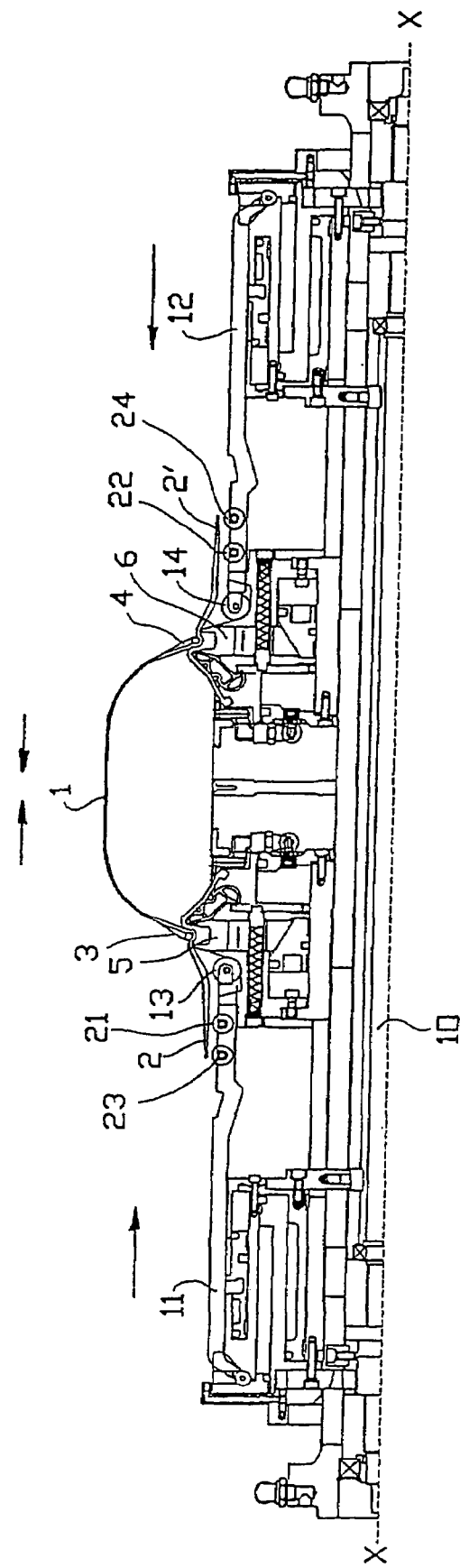
Figure 2D:
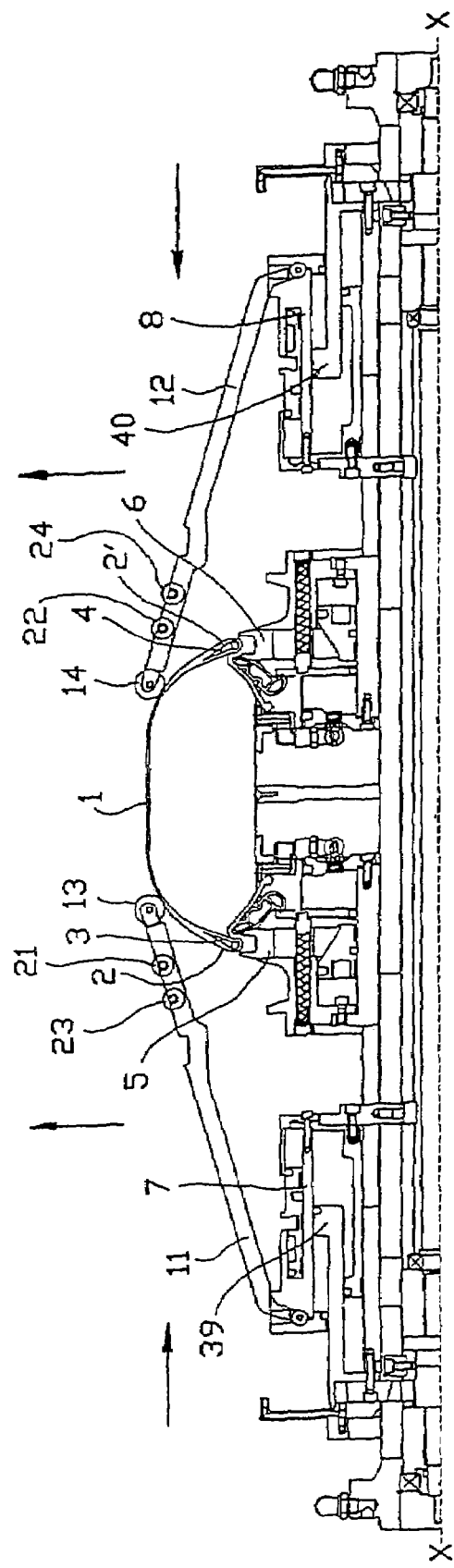

In the next stage, shown in FIG. 2C, the distance between the bead clamping segments 5, 6 is reduced so that the distance between the beads 3, 4 also becomes smaller, and the internal bead supports are raised. Due to air supplied under pressure from within, the cylindrical carcass sleeve starts to expand into a torus-like shape.

Immediately after that the turn-up mechanism is put into operation, in which the arms 11, 12 among others by operating the piston/cylinders 7,8 39,40 are moved axially towards each other (considered on either side of the plane of symmetry). Counter to the spring force of the draw springs running circumferentially through the recesses 35, 36, they also move with the turn-up rollers 13, 14 radially to the outside. As a result the tyre components 2a are turned by the turn-up rollers 13, 14 about the bead 3, 4 and against the side wall of the torus-shaped carcass. In the ultimate position of the arms they are in the situation shown in FIG. 2D. During the upward motion of the rollers 13, 14 the sideward tyre components are able to roll over them without problems until in abutment with the side walls of the tyre to be made.

Also when the arms are brought into the tilted position, the portion in question of the tyre components slides off from over the support rollers 21-24, or rather rolls off from over them.

Figure 3A:
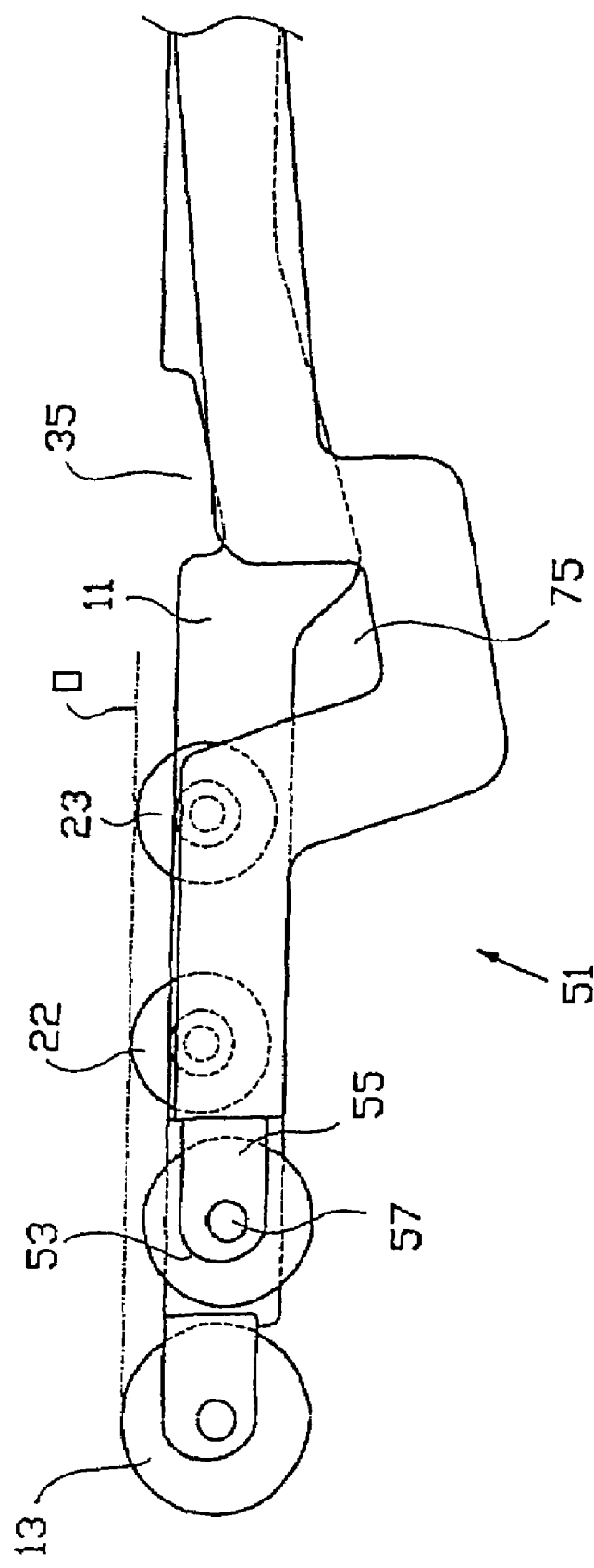

In FIG. 3A it is schematically shown how an arrangement in the sense of the tyre drum according to International patent application WO 98/52740 could be designed. Here the first ends of the—primary—arms 11 extend to closer to the ring segments. Between each pair of primary arms 11 a secondary arm 51 has been placed, of which the end is also hinged to an axially movable slide. For further information about this said patent application is referred to. The arms 51 have been provided with fork-shaped accommodation spaces 55, in which by means of shaft 57 a free-running turn-up roller 53 has been attached. The turn-up roller 53 is situated axially between the turn-up rollers 13 and the support rollers 21a and 21b of adjacent primary arms 11. As a result, in tangential direction the turn-up rollers 53 can extend slightly in intermediate spaces between those rollers. The surface 69 of the turn-up rollers 51 lies radially below the aforementioned plane O of adjacent primary arms 11 and preferably also below the circumferentially extending connecting line of consecutive planes O, so that the tyre components are fully supported on the support rollers and turn-up rollers of the primary arms. Also the forks 55 are radially below the forks 15.

At a location between the last support rollers 23 and ahead of the recess 35 of the primary arms 11, the arms 51 are also provided with a recess 75 for a usual, tensile means, such as an elastic ring, extending circumferentially about the drum.

In FIG. 3B all this is shown in perspective view. In the lower portion a number of primary and secondary arms 11, 51 is shown in the initial position. The primary arms 11 are alternated with secondary arms 51, in which the turn-up rollers 53 are axially and radially recessed with respect to the turn-up rollers 13 and radially recessed with respect to the support rollers 21, 23.

In FIG. 3B a primary arm 11 and a secondary arm 51 for reasons of illustration have been moved out of their lying initial position, in which it is remarked that the position shown is not equal to the turn-up position, because then the arms will have been moved axially as well.

The invention claimed is:

1. Tyre drum including a turn-up mechanism for use in building an unvulcanized tyre having tyre components of rubber, including reinforcement cords and two bead cores which either may or may not be provided with a bead filling strip, which tyre drum is provided with a central shaft, two ring segments placed around the shaft and spaced apart for supporting the bead cores and means for radially expanding the part of the tyre components that is situated within the ring segments and the tyre drum on either side outside of the ring segments being provided with a set of axially extending arms, each of the arms at a first free end oriented towards the ring segment being provided with a first turn-up means comprising a turn-up roller, and at an opposite second end being hinged to an axially shiftable arm support, near the first end at least a part of each of the arms being further provided with support means for supporting the tyre component, the support means in an initial position forming a circumferential support surface for the tyre components, the tyre drum further being provided with means for shifting the arm supports in order to move the second ends of both sets of arms axially towards each other, the arms being tiltable in radial planes from the initial position to a tilting position in order to thus move the first ends axially and radially while pressing the part of the tyre components situated outside of the ring segments against the expanded part of the tyre components situated within the ring segments, the support means of each of the arms comprising at least one rotatable support roller provided with a support surface for directly supporting the tyre component.

2. Tyre drum according to claim 1, the arm being provided with at least two support rollers arranged adjacent to each other on either side of the arm.

3. Tyre drum according to claim 1, the arm being provided with at least two support rollers arranged spaced apart in arm direction.

4. Tyre drum according to claim 1, the support roller being arranged on the arm in a free-running manner.

5. Tyre drum according to claim 1, the support surface of the support roller being in one plane with the surface of the turn-up roller, which in the initial position is parallel to the centre line of the central shaft.

6. Tyre drum according to claim 1, each set of arms comprising primary arms provided with one or more support rollers and secondary arms that have no support rollers and that are situated in between the primary arms, the support rollers of the primary arms defining a circumferential series of support surfaces and the turn-up rollers of the secondary arms being radially recessed with respect to the turn-up rollers of the primary arms.

7. Tyre drum according to claim 6, the turn-up roller of the secondary arms in the initial position being situated with respect to the ring segments in axial direction behind the turn-up roller of the adjacent primary arms.

8. Tyre drum according to claim 7, the turn-up roller of the secondary arms considered in axial direction being situated between the turn-up roller of the primary arms and the nearest support roller on those arms.

9. Tyre drum according to claim 1, secondary arms provided with a turn-up roller being arranged between the arms provided with one or more support rollers, of which secondary arms the turn-up roller in the initial position is recessed in comparison with the turn-up roller of the adjacent arms provided with one or more support rollers, of which arms the support rollers define a circumferential series of support surfaces.

* * * * *